United States Patent [19]

Miskolczi et al.

[11] 3,894,478
[45] July 15, 1975

[54] ROLL FORMER

[75] Inventors: Peter Miskolczi, Weston; Michael Joseph Ondrus, Rexdale, both of Canada

[73] Assignee: Miskolczi Machine Tool Limited, Islington, Canada

[22] Filed: May 6, 1974

[21] Appl. No.: 467,364

[30] Foreign Application Priority Data
Jan. 28, 1974  Canada .............................. 191262

[52] U.S. Cl. ................. 93/58.2 R; 83/481; 83/698; 93/58.1
[51] Int. Cl. .............................................. B31b 1/14
[58] Field of Search ............. 93/58 R, 58.1, 58.2 R, 93/58.2 F, 59 R, 58.4; 83/698, 481, 663, 665, 678; 76/107 R, 107 C; 279/86, 97

[56] References Cited
UNITED STATES PATENTS

| | | | |
|---|---|---|---|
| 3,238,853 | 3/1966 | Sarka............................. | 93/58.2 F |
| 3,296,910 | 1/1967 | Haskin, Jr. et al................ | 83/698 X |
| 3,466,982 | 9/1969 | Sullivan........................... | 93/58.2 R |
| 3,528,334 | 9/1970 | Geschwender................... | 83/678 X |

*Primary Examiner*—Roy Lake
*Assistant Examiner*—James F. Coan
*Attorney, Agent, or Firm*—Rogers, Bereskin & Parr

[57] ABSTRACT

Cutting and creasing apparatus having upper and lower rolls including axially extending cylindrical projections at their respective ends. A pair of upper couplings are rotatably connected one to each of a pair of end supports for rotation about an upper axis and the upper couplings include means for connecting the cylindrical projections of the upper roll to the upper coupling. Similarly a pair of lower couplings are rotatably connected to the end supports for rotation about a lower axis parallel to the upper axis. The lower couplings include means for connecting the cylindrical projections of the lower roll to the lower couplings. Each of the upper and lower couplings includes a locating member defining a transverse recess for locating a corresponding one of the cylindrical projections whereby the associated one of the rolls is positioned for rotation about a corresponding one of the upper and lower axes and fastener means to retain the projections in the corresponding recesses.

5 Claims, 2 Drawing Figures

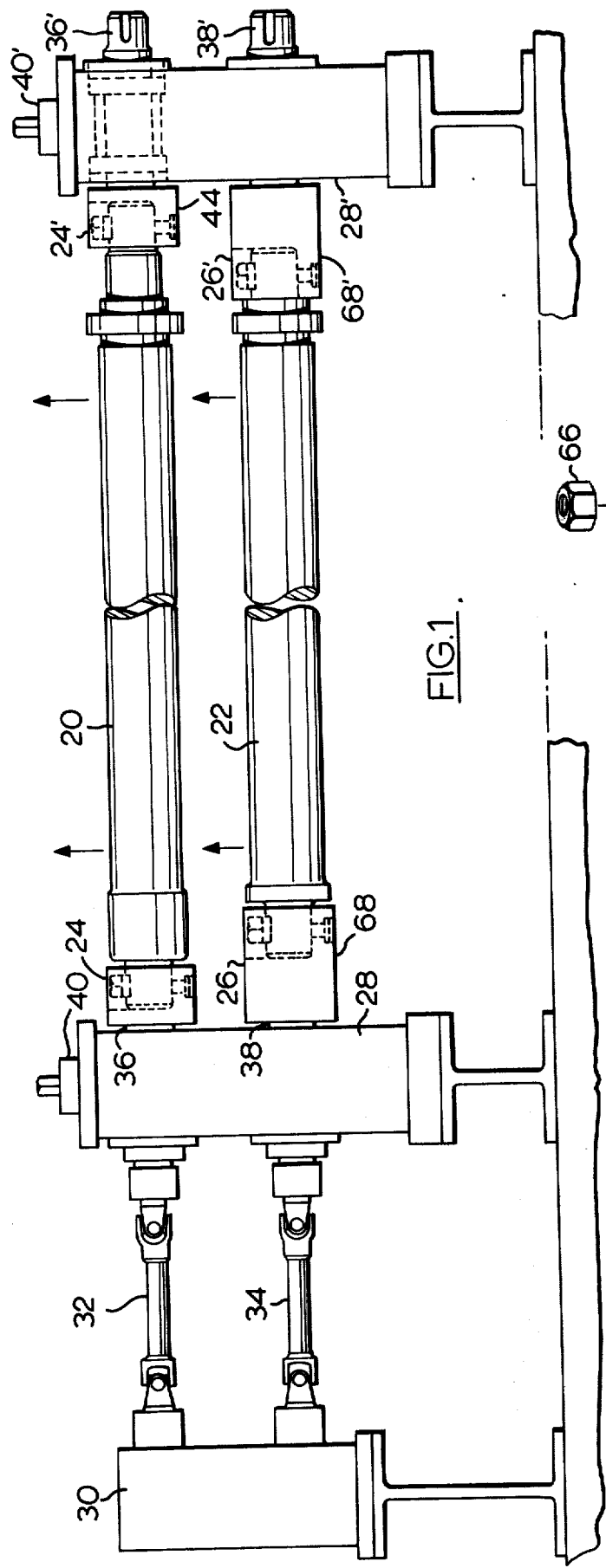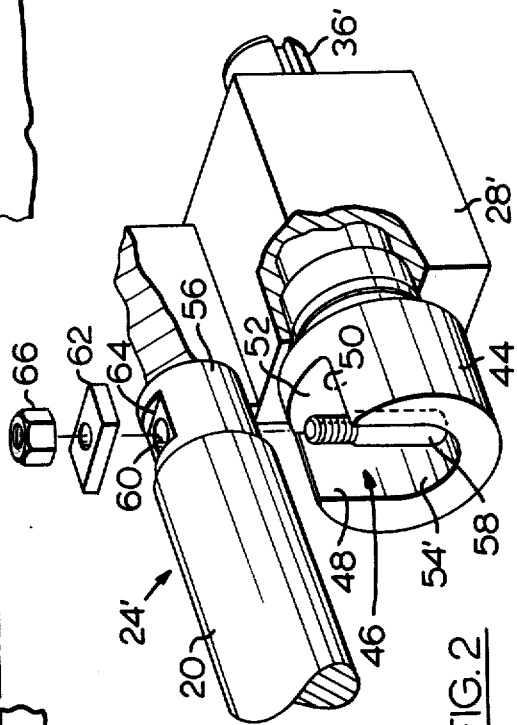

ROLL FORMER

This invention relates to apparatus for cutting and creasing and more particularly to apparatus which permits ready replacement of cutting and creasing rolls.

Cutting and creasing rolls are commonly arranged in pairs and are spaced vertically in parallel arrangement. The rolls are supported for vertical adjustment in end supports and at least one of these supports is made to enable an operator to disassemble the rolls from the apparatus. Such a support can be expensive to make because it must be movable and yet be sufficiently rigid to ensure that when the rolls are in place they are properly aligned for use in cutting and creasing.

It is an object of the present invention to provided cutting and creasing apparatus having readily replaceable rolls and simplified end supports.

Accordingly, in a particular preferred embodiment, the present invention provides apparatus for cutting and creasing in which upper and lower rolls are attached by respective cylindrical end projections to upper and lower couplings for rotation about respective upper and lower axes. The arrangement is such that the rolls can be disconnected from the couplings for removal transversely of the axes without further disassembly of the apparatus.

The invention will be better understood with reference to the drawings, in which:

FIG. 1 is a side view of apparatus incorporating the invention; and

FIG. 2 is a perspective exploded view of a portion of the apparatus shown in FIG. 1.

Reference is made to the drawings in which respective upper and lower cutting and creasing rolls 20, 22 extend in parallel horizontal arrangement and are supported at their ends in respective pairs of couplings 24, 24' and 26, 26'. The couplings are rotatably coupled to respective end supports 28, 28' and a drive unit 30 is coupled by respective drive shaft assemblies 32, 34 to the end support 28 for turning the rolls 20, 22 about respective upper and lower axes. The drive unit 30 transmits torque to the assemblies 32, 34 such that these assemblies rotate in opposite directions at the same angular velocity.

End support 28 includes a pair of short shafts 36, 38 rotatably mounted in the support 28 and coupled at their respective first ends to the assemblies 32, 34 and at their other ends to the couplings 24, 26. Similar shafts 36', 38' are provided in the support 28'. All of the short shafts are carried in suitable taper roller bearings in the respective supports 28, 28' and a typical set of taper roller bearings is indicated in broken outline for shaft 36' in support 28'. As is conventional in the art, the vertical spacing between the rolls 20, 22 can be adjusted by use of calibrated adjusters 40, 40' on the respective tops of the supports 28, 28'.

The apparatus described thus far differs from conventional apparatus of this type in that the end supports 28, 28' are not designed to provide for removal of the rolls 20, 22. By contrast the end supports 28, 28' are of a simple design because the rolls can be removed in a novel manner provided by the present invention. The structure of the rolls and their removal will now be described.

Consider first the upper roll 20 which is attached to upper couplings 24, 24'. Coupling 24' is typical of both of these couplings and is shown in detail in FIG. 2. A locating member 44 is attached to the end of shaft 36' and has a generally cylindrical outer form with a transversely extending recess 46 formed in it. This recess has substantially parallel side walls 48, 50 which terminate at their inner axial extremities in an end wall 52. Transversely, the side walls 48, 50 blend smoothly into a curved wall 54 which matches the external contour of a cylindrical projection 56 at the end of the roll 20. The curved wall 54 is positioned to be concentric with the axis of rotation of the shaft 36' so that when the roll 20 is located with the cylindrical projection 56 in engagement with the curved wall 54, the axis of the roll 20 coincides with the axis of rotation of the shaft 36'. Consequently the roll 20 will then rotate about an upper roll axis when the shaft 36' rotates.

The roll 20 can be retained in engagement with the locating member 44 by a fitted bolt 58 which extends transversely through the member 44 in parallel arrangement with the side walls 48, 50 of the recess 46. A transversley extending opening 60 in the cylindrical projection 56 of roll 20 receives the bolt 58 and a squared washer 62 is located in a milled recess 64 of the cylindrical projection 56. The coupling assembly is completed by the addition of a nut 66. Coupling 24' is proportioned so that the bolt does not project outside the confines of the outer cylindrical wall of the locating member 44. The head of the bolt is contained in a suitable recess as indicated in broken outline in FIG. 1. It will be appreciated that any suitable fastener can be used in place of bolt 58 and the associated parts.

The couplings 24, 24' are arranged so that the respective bolts (such as bolt 58 of coupling 24') are parallel. This allows the nut 66 and corresponding nut of the coupling 24 to be removed so that the roll 20 can then be lifted vertically out of the couplings 24, 24'. It will be evident from a consideration of FIG. 1 that the lower couplings 26, 26' differ from their corresponding couplings 24, 24' in that they include respective locating members 68, 68' which are longer axially than the previously described member 44. This allows the roll 22 to be made shorter than the roll 20 to permit the roll 22 to be lifted vertically between the couplings 24, 24' after the roll 20 has been removed.

To replace the rolls 20, 22 with new rolls, the roll 20 is first removed followed by the roll 22. Subsequently, the new rolls are placed between the end supports 28, 28' by placing the lower of the new rolls in the couplings 26, 26' and then engaging the upper of the new rolls in the couplings 24, 24'. The new rolls are then in place to rotate about their respective upper and lower axes of rotation.

It will now be evident that the end supports 28, 28' can be of a very simple form. In fact, the supports can be interchangeable as indicated in FIG. 1 in which the shafts 36, 38' can be used to drive the rolls if the drive is to be at the other end of the apparatus. This simplifies manufacture of the end supports and also limits the supply of spare parts necessary to maintain the apparatus.

It will be appreciated that care must be taken when assembling the rolls in the couplings to ensure that no foreign material becomes engaged between one of the rolls and an associated coupling because this would effectively displace the axis of the roll from the intended axis of rotation.

What we claim is:

1. Apparatus for use in cutting and creasing, the apparatus comprising:
   upper and lower rolls having axially extending cylindrical projections at respective ends thereof;
   a pair of end supports;
   a pair of upper couplings rotatably connected one to each of the end supports for rotation about an upper axis, said upper couplings including means releasably connecting the cylindrical projections of the upper roll to the upper coupling for rotation of this roll about the upper axis;
   a pair of lower couplings rotatably connected one to each of the end supports for rotation about a lower axis which is parallel to the upper axis, said lower couplings including means releasably connecting the cylindrical projections of the lower roll to the lower couplings for rotation of this roll about the lower axis;
   each of the upper and lower couplings including a locating member defining a transverse recess for locating a corresponding one of the cylindrical projections whereby the associated one of the rolls is positioned for rotation about a corresponding one of the upper and lower axes;
   each of the connecting means comprising fastener means co-operable with corresponding cylindrical projections and locating members to retain the rolls in the coupling; and drive means coupled to at least one each of the upper and lower couplings to rotate the rolls in opposite directions.

2. Apparatus as claimed in claim 1 in which the lower roll is no longer than the axial spacing between the upper couplings whereby the lower roll can be moved vertically between these couplings for replacing the lower roll.

3. Apparatus as claimed in claim 1 in which each recess in the respective locating members is defined by a pair of transverse and parallel side walls which blend into a curved wall having a contour which matches that of a corresponding one of the cylindrical projections on the rolls so that when this cylindrical projection is in engagement with the curved wall the associated roll is aligned for rotation about the corresponding one of the upper and lower axes.

4. Apparatus as claimed in claim 3 in which the fastener means comprises bolts engageable one through each of the locating members and corresponding cylindrical projections, and nuts threadably engageable on the bolts to retain the cylindrical projections in the corresponding recesses.

5. Apparatus as claimed in claim 2 in which each recess in the respective locating members is defined by a pair of transverse and parallel side walls which blend into a curved wall having a contour which matches that of a corresponding one of the cylindrical projections on the rolls so that when this cylindrical projection is in engagement with the curved wall the associated roll is aligned for rotation about the corresponding one of the upper and lower axes, and in which the fastener means comprises bolts engageable one through each of the locating members and corresponding cylindrical projections, and nuts threadably engageable on the bolts to retain the cylindrical projections in the corresponding recesses.

* * * * *